US006950512B1

United States Patent
Hauptmann et al.

(10) Patent No.: US 6,950,512 B1
(45) Date of Patent: Sep. 27, 2005

(54) CIRCUIT ARRANGEMENT FOR FORMING THE TERMINATION OF AN ANALOGOUS SUBSCRIBER LINE

(75) Inventors: Joerg Hauptmann, Wernberg (AT); Alexander Kahl, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/807,993

(22) PCT Filed: Jan. 5, 2000

(86) PCT No.: PCT/DE00/00046

§ 371 (c)(1),
(2), (4) Date: Jul. 13, 2001

(87) PCT Pub. No.: WO00/42759

PCT Pub. Date: Jul. 20, 2000

(30) Foreign Application Priority Data

Jan. 15, 1999 (DE) ................................ 199 01 464

(51) Int. Cl.[7] .............................................. H04M 7/04
(52) U.S. Cl. .................. 379/398; 379/394; 379/399.01
(58) Field of Search .......................... 379/399.01, 394, 379/398

(56) References Cited

U.S. PATENT DOCUMENTS 4,403,115 A * 9/1983 Simokat ..................... 379/183
5,500,894 A    3/1996 Hershbarger
5,515,434 A    5/1996 Cotreau
6,393,110 B1 * 5/2002 Price ..................... 379/399.01

FOREIGN PATENT DOCUMENTS

EP             467367          1/1992

OTHER PUBLICATIONS

English Language abstract of EP-0 467 367.

* cited by examiner

Primary Examiner—Sinh Tran
Assistant Examiner—Daniel Swerdlow
(74) Attorney, Agent, or Firm—Greenblum & Bernstein, P.L.C.

(57) ABSTRACT

The invention relates to a circuit arrangement for forming the termination of an analogous subscriber line which comprises a first connection and a second connection for connecting a twin-wire analogous subscriber line. Said first connection is linked with said second connection via a series connection of a first capacitor, at least one first adjustable resistor and one second capacitor. According to the invention, a direct current source is linked with the first point of linkage of the first capacitor and the first adjustable resistor. Said direct current source impresses a current which serves to adjust an operating point for voice and data transmission via the analogous subscriber line. The first and the second capacitor block equisignals on the subscriber line so that no direct current can flow via the analogous subscriber line.

6 Claims, 1 Drawing Sheet

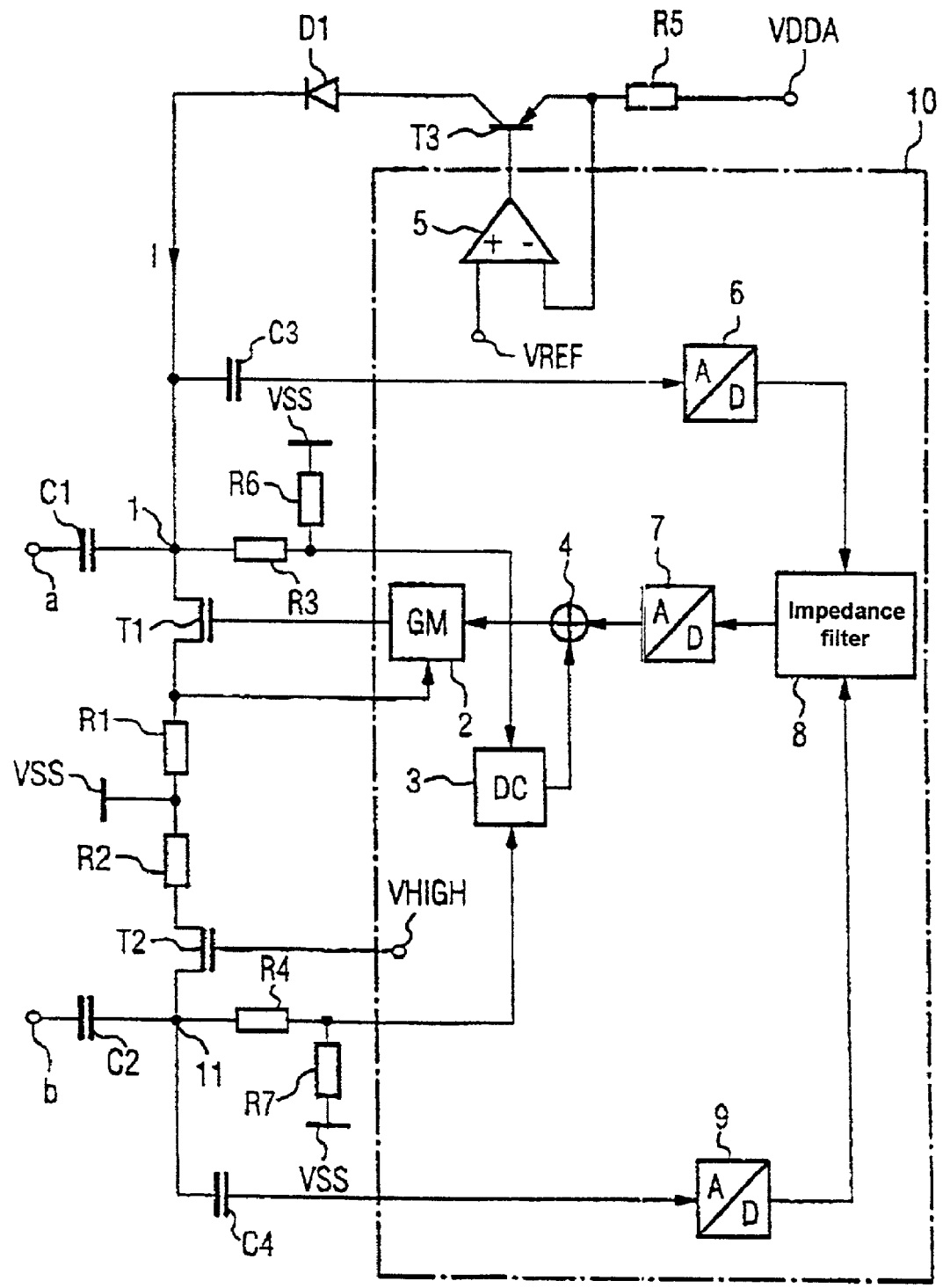

CIRCUIT ARRANGEMENT FOR FORMING THE TERMINATION OF AN ANALOGOUS SUBSCRIBER LINE

The invention relates to a circuit arrangement for forming the termination of an analog subscriber line.

A circuit arrangement for terminating an analog subscriber line (SLIC=Subscriber Line Circuit) at the subscriber end forms a terminal impedance for the subscriber line both for AC signals and for DC signals. In this context, the terminal impedance for DC signals (DC terminal impedance) and for AC signals (AC terminal impedance) is connected to the subscriber line when there is a connection for signal transmission.

The DC terminal impedance is used to set an operating point for the circuit arrangement for terminating the analog subscriber line and to signal to a remote station (e.g. an exchange) that there is a connection. When signals (e.g. voice or data signals) are transmitted or received, the current flowing through the subscriber line is then modulated by the operating point set by the DC terminal impedance. In this case, the operating point depends on the direct current, supplied by the remote station, which flows through the subscriber line and on the DC characteristic set by the DC terminal impedance.

The DC and AC terminal impedances can be changed or adjusted in line with country-specific requirements only by changing the circuitry, for example by replacing resistors, capacitors, etc.

The technical problem on which the invention is based is therefore that of specifying a circuit arrangement for terminating an analog subscriber line which forms, with little circuit complexity, a controllable AC terminal impedance which is programmable, and where the subscriber line is free of direct current.

The invention relates to a circuit arrangement for forming the termination of an analog subscriber line which has a first connection and a second connection for connecting the two-wire analog subscriber line. The first connection is connected to the second connection by means of a series circuit comprising a first capacitor, at least one variable resistor and a second capacitor. According to the invention, a DC source is connected to the junction point between the first capacitor and the variable resistor. The DC source impresses a current which is used to set an operating point for signal transmission via the analog subscriber line. The first and the second capacitor mean that DC signals are blocked on the subscriber line, so that no direct current can flow through the analog subscriber line. In addition, a terminal impedance for AC signals is formed by means of the first and the second capacitor and the variable resistors. The variable resistors allow the operating point to be set for DC signals and allow the terminal impedance to be set for AC signals.

In one preferred embodiment, the DC source is formed by a transistor and a resistor, the load path of the transistor being connected in series with the resistor, and the free connection of the resistor being connected to a supply voltage. The control connection of the transistor is connected to the junction point between the load path of the transistor and the resistor by means of a control circuit.

In a particularly preferred embodiment, the control circuit for the DC source has an operational amplifier which compares the voltage at the junction point between the load path of the transistor and the resistor with a reference voltage and uses its output voltage to control the transistor on the basis of this.

Preferably, the DC source has a diode which is connected in series with the load path of the transistor. Advantageously, the diode prevents the transistor from becoming damaged by the high voltages of a call signal.

Other advantages, features and opportunities for application of the invention can be found in the description of illustrative embodiments below in conjunction with the drawing. In the drawing:

FIG. 1 shows an illustrative embodiment of the circuit arrangement for terminating an analog subscriber line which is used in a module for data transmission via an analog subscriber line.

FIG. 1 shows a circuit arrangement for terminating an analog subscriber line, where the analog subscriber line has two wires which can be connected to a first connection a and to a second connection b of the circuit arrangement.

The first connection a is connected to a reference-ground potential VSS via a series circuit comprising a first capacitor C1, a first n-channel MOSFET T1 and a first resistor R1. The second connection b is connected to the reference-ground potential VSS via a series circuit comprising a second capacitor C2, a second n-channel MOSFET T2 and a second resistor R2. In this illustrative embodiment, the reference-ground potential VSS is equal to the zero potential. The first capacitor C1 and the second capacitor C2 block DC signals on the analog subscriber line. Hence, no direct current flows into the circuit arrangement via the subscriber line.

To set a DC operating point for the circuit arrangement, a voltage is measured at the junction point 1 between the first capacitor and the first n-channel MOSFET T1 using a first voltage divider R3 and R6 and is supplied to a DC operating point control circuit 3. In addition, a voltage is measured at the junction point 11 between the second capacitor C2 and the second n-channel MOSFET T2 using a second voltage divider R4 and R7 and is supplied to the DC operating point control circuit 3. The DC operating point control circuit 3 uses an adding circuit 4 and an analog integrator circuit 2 to control the resistance of the load path of the first n-channel MOSFET T1, and hence the DC operating point of the circuit arrangement.

So that measurable DC voltages are produced at the junction point 1 and the junction point 11, the junction point 1 is connected to a DC source which impresses a current I. The control connection of the second n-channel MOSFET T2 is at a high potential VHIGH in this operating state, which means that the resistance of the load path of the second n-channel MOSFET T2 has a low value.

The DC source for impressing the current I has a pnp bipolar transistor T3, a resistor R5 and an operational amplifier 5. One end of the resistor R5 is connected to a supply voltage VDDA, and the other end is connected to the emitter of the pnp bipolar transistor T3. From the collector of the pnp bipolar transistor T3 flows the current I which is impressed into the circuit arrangement. The positive input of the operational amplifier 5 is supplied with a reference voltage VREF, and the negative input of the operational amplifier 5 is supplied with the voltage on the emitter of the pnp bipolar transistor T3. The output voltage from the operational amplifier 5 controls the pnp bipolar transistor T3. The collector of the pnp bipolar transistor also has the anode of a diode Di connected to it. The diode Di is used to protect the pnp bipolar transistor T3 against destruction by the high voltages of the call signals. The reference voltage VREF can be used to set the current I.

An AC terminal impedance for the analog subscriber line is set digitally by means of an impedance filter 8.

To this end, an AC voltage at the junction point 1 is supplied to the impedance filter 8 via a third capacitor C3 and an analog/digital converter 6 connected downstream. In addition, an AC voltage at the junction point 11 is supplied to the impedance filter 8 via a fourth capacitor C4 and a second analog/digital converter 9 connected downstream. The impedance filter 8, which may be in the form of a digital filter, uses the digital AC signals to calculate a signal required for setting the AC terminal impedance. The signal is converted into an analog voltage by means of a digital/analog converter 7 and is added to the output voltage of the circuit by the adding circuit 4 in order to set the DC operating point 3. The output voltage of the adding circuit 4 is supplied to the analog integrator circuit 2, which subtracts a voltage at the junction point between the n-channel MOSFET T1 and the first resistor R1 from the supplied voltage and integrates the difference voltage.

This circuit arrangement is provided with two different setting paths for setting both the DC operating point and the AC terminal impedance, with the first n-channel MOSFET T1 being used for setting the AC terminal impedance and the DC operating point. Since a direct current or a DC voltage is blocked on the subscriber line by the first capacitor C1 and the second capacitor C2 in this circuit arrangement, the DC source needs to impress a current I through the first n-channel MOSFET T1, the first resistor R1, the second resistor R2 and the second n-channel MOSFET T2 in order to set the DC operating point. The DC operating point control circuit 3 and the first n-channel MOSFET T1 are then used to set the direct current through the load path of the first n-channel MOSFET T1, and hence the DC operating point.

What is claimed is:

1. A circuit arrangement for forming the termination of an analog subscriber line, comprising:
   a first connection and a second connection for the subscriber line, the first connection being connected to the second connection by a series circuit comprising a first capacitor, at least one variable resistor and a second capacitor;
   a DC source connected to a first node between the first capacitor and the variable resistor; and
   a DC operating point setting circuit connected to the variable resistor and configured to adjust the variable resistor based on DC voltage values measured at the first node and at a second node located between the second capacitor and the variable resistor.

2. The circuit arrangement as claimed in claim 1, wherein the DC source comprises a transistor and a resistor, the load path of the transistor being connected in series with the resistor, and the control connection of the transistor being set by a control circuit.

3. The circuit arrangement as claimed in claim 2, wherein the control circuit comprises an operational amplifier whose output is connected to the control connection of the transistor of the DC source, whose negative input is connected to a junction point between the transistor and the resistor of the DC source and whose positive input has a reference voltage applied to it.

4. The circuit arrangement as claimed in claim 2 wherein the DC source comprises a diode which is connected in series with the load path of the transistor.

5. The circuit arrangement as claimed in claim 3 wherein the DC source comprises a diode which is connected in series with the load path of the transistor.

6. The circuit arrangement as claimed in claim 1, further comprising an AC terminal impedance control circuit connected to the variable resistor and configured to adjust the variable resistor based on AC voltage values measured at the first and second nodes.

* * * * *